US011568049B2

(12) United States Patent
Mathews et al.

(10) Patent No.: US 11,568,049 B2
(45) Date of Patent: Jan. 31, 2023

(54) METHODS AND APPARATUS TO DEFEND AGAINST ADVERSARIAL MACHINE LEARNING

(71) Applicant: McAfee, LLC, Santa Clara, CA (US)

(72) Inventors: Sherin M. Mathews, Santa Clara, CA (US); Celeste R. Fralick, Plano, TX (US)

(73) Assignee: McAfee, LLC, San Jose, CA (US)

( * ) Notice: Subject to any disclaimer, the term of this patent is extended or adjusted under 35 U.S.C. 154(b) by 791 days.

(21) Appl. No.: 16/586,476

(22) Filed: Sep. 27, 2019

(65) Prior Publication Data
US 2021/0097176 A1 Apr. 1, 2021

(51) Int. Cl.
| G06F 21/56 | (2013.01) |
| G06F 16/901 | (2019.01) |
| G06K 9/62 | (2022.01) |
| G06N 3/04 | (2006.01) |

(52) U.S. Cl.
CPC .......... G06F 21/56 (2013.01); G06F 16/9027 (2019.01); G06K 9/6215 (2013.01); G06K 9/6267 (2013.01); G06N 3/0481 (2013.01)

(58) Field of Classification Search
CPC ............... G06F 21/56; G06F 16/9027; G06K 9/6215; G06K 9/6267; G06N 3/0481; G06N 3/084; G06N 5/003; G06N 5/045; G06N 20/20; G06N 3/0454; G06N 3/08; G06N 20/00; G06N 3/082; G06N 3/04; G06N 7/005; G06N 5/02; G06V 10/454; G06V 10/82; G06V 10/764; G06V 10/26

See application file for complete search history.

(56) References Cited

U.S. PATENT DOCUMENTS

| 11,003,444 | B2 * | 5/2021 | Zhou | G06F 8/65 |
| 11,023,593 | B2 * | 6/2021 | Lee | G06Q 10/06 |
| 11,049,018 | B2 * | 6/2021 | Yang | G06V 10/82 |
| 11,270,157 | B2 * | 3/2022 | Chen | G06V 10/26 |
| 2018/0357542 | A1 * | 12/2018 | Wu | G06N 5/003 |
| 2019/0318085 | A1 * | 10/2019 | Mathur | G06F 21/55 |
| 2020/0057854 | A1 * | 2/2020 | Wojnowicz | G06N 7/005 |
| 2020/0401697 | A1 * | 12/2020 | Smith | G06N 20/00 |
| 2020/0409760 | A1 * | 12/2020 | Nakashima | G06N 3/0454 |
| 2021/0058415 | A1 * | 2/2021 | Sanzgiri | H04L 63/1425 |
| 2021/0097382 | A1 | 4/2021 | Mathews et al. | |
| 2021/0174539 | A1 * | 6/2021 | Duong | G06N 3/082 |

(Continued)

OTHER PUBLICATIONS

"Visual Tree Convolutional Neural Network in Image Classification"; Liu, Yuntao, 2018 24th International Conference on Pattern Recognition (ICPR) (Year: 2018).*

(Continued)

*Primary Examiner* — Michael S Osinski
(74) *Attorney, Agent, or Firm* — Hanley, Flight & Zimmerman, LLC

(57) ABSTRACT

Methods, apparatus, systems and articles of manufacture to defend against adversarial machine learning are disclosed. An example apparatus includes a model trainer to train a classification model based on files with expected classifications; and a model modifier to select a convolution layer of the trained classification model based on an analysis of the convolution layers of the trained classification model; and replace the convolution layer with a tree-based structure to generate a modified classification model.

20 Claims, 10 Drawing Sheets

(56) References Cited

U.S. PATENT DOCUMENTS

| | | | |
|---|---|---|---|
| 2021/0216806 A1* | 7/2021 | Yang | G06T 7/11 |
| 2021/0303986 A1* | 9/2021 | Saha | G06F 16/285 |
| 2022/0121695 A1* | 4/2022 | Zhang | G06N 3/0454 |

OTHER PUBLICATIONS

Ahmadi et al., "Novel Feature Extraction, Selection and Fusion for Effective Malware Family Classification", In Proceedings of the Sixth ACM Conference on Data and Application Security and Privacy (pp. 183-194), Mar. 9-11, 2016, 12 pages.

Loy, C. et al. "Retrospective factorial fitting and reverse design of experiments", Total Quality Management, 13:5, 589-602, DOI:10.1080/0954412022000002009, published online on Aug. 25, 2010, 15 pages.

Bower, Keith M., "What Is Design of Experiments (DOE)?", obtained from https://asq.org/quality-resources/design-of-experiments, on Sep. 27, 2019, 8 pages.

Mathews, Sherin Mary, "Explainable Artificial Intelligence Applications in NLP, Biomedical, and Malware Classification: A Literature Review", CompCom 2019, AISC 998, pp. 1269-1292, 2019, 24 pages.

International Searching Authority, "International Search Report and Written Opinion," issued in connection with PCT Application No. PCT/US2020/043306, dated Nov. 13, 2020, 13 pages.

Fuhl et al., "Training Decision Trees as Replacement for Convolution Layers," arXiv.org, proceedings of the AAAI Conference on Artificial Intelligence, last revised Feb. 11, 2020, 9 pages.

Zhang et al., "Self-Attention Generative Adversarial Networks," arXiv.org, proceedings of the 36th International Conference on Machine Learning, Long Beach, California, PMLR, last revised Jun. 14, 2019, 10 pages.

International Searching Authority, "International Preliminary Report on Patentability," issued in connection with PCT Application No. PCT/US2020/043306, dated Mar. 15, 2022, 8 pages.

European Patent Office, "Communication pursuant to Rules 161(1) and 162 EPC," issued in connection with Application No. 20757013.6, dated May 6, 2022, 3 pages.

* cited by examiner

METHODS AND APPARATUS TO DEFEND AGAINST ADVERSARIAL MACHINE LEARNING

FIELD OF THE DISCLOSURE

This disclosure generally relates to malware detection, and, more particularly, to methods and apparatus to defend against adversarial machine learning.

BACKGROUND

Malware (e.g., viruses, worms, trojans, ransomware) is malicious software that is disseminated by attackers to launch a wide range of security attacks, such as stealing user's private information, hijacking devices remotely to deliver massive spam emails, infiltrating a user's online account credentials, etc. The introduction of malware to a computing system may cause serious damages and significant financial loss to computer and/or Internet users.

Figure 1:
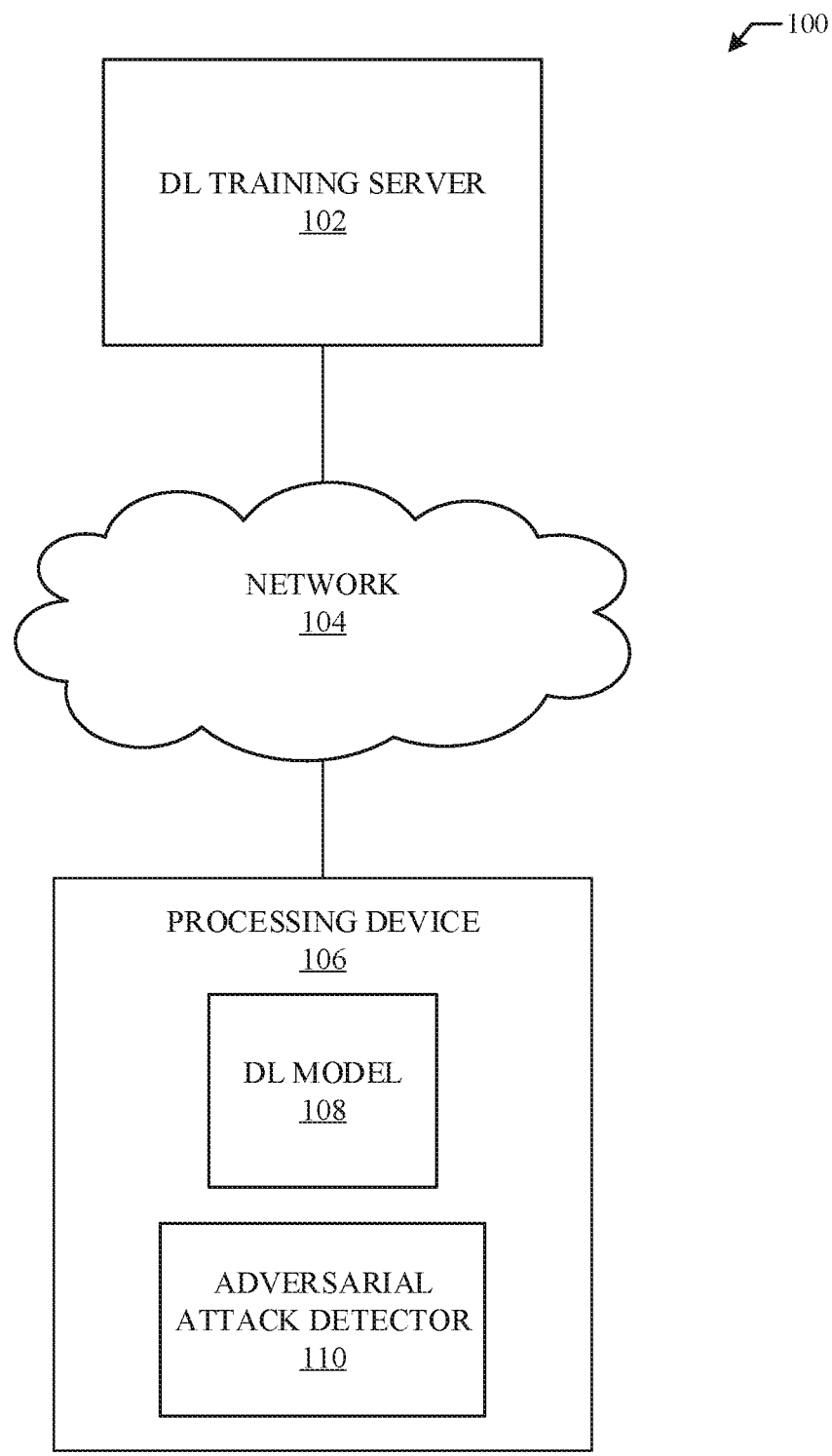
FIG. 1 illustrates an example environment where malware classification learning algorithms may be trained and/or deployed to an end user.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A machine learning (ML), deep learning (DL), and/or other artificial intelligent approach (AI) may be utilized to identify malware. Such malware detection may be performed using a supervised ML and/or other unsupervised ML models and deep learning (DL) algorithms such as, for example, a convolutional neural network (CNN), a recurrent neural network (RNN), a machine learning algorithm etc., configured to be trained using input data with known (e.g., an expected classification of the model) classifications. For example, the input data may be files that are known to be malware or non-malware. The DL model is trained using the input data to be able to classify whether a file is malware or not. However, such models may be attacked by an attacker to make the trained model ineffective. For example, in a gradient-based adversarial attack, an attacker can compute the gradients of a model using back-propagation to generate small but intentionally worst-case perturbations a dataset that result in a trained model outputting misclassification with high confidence values. Examples disclosed herein reduce the vulnerability of DL models to such gradient-based attacks by replacing, before deploying the model, one or more convolution layers of a trained model with tree-based structures so that an attacker cannot compute the gradients using back-propagation.

Once deployed, a trained model operating in a real world environment is vulnerable to adversarial activity. Adversarial activity causes the data distribution for a model to change over time, corresponding to concept drift. As used herein, concept/model drift occurring with malware, or malware concept/model drift, refers to any change in malware properties over time. For example, an approach utilizing a supervised or an unsupervised ML and/or AI model to detect malware may be trained to detect malware that performs a specific function. If such a specific function is altered over time, the trained supervised or unsupervised ML and/or AI models may not reliably detect such a concept drift. Additionally, model drift may be the result of an adversarial attack on a trained model. Examples disclosed herein utilize a design of experiments (DOE) protocol (e.g., during training of a model) and a reverse DOE protocol analysis (e.g., after deployment of the trained model) to identify whether concept drift and/or an adversarial attack has occurred with respect to the trained model. The DOE protocol identifies factors of the model that contributed to the classification generated by the model. The reverse DOE protocol analysis identifies the combination of features that were used by the trained model. Examples disclosed herein compare the outputs of the DOE protocol and the reverse DOE protocol analysis to identify concept drift and/or adversarial attacks.

Additionally, most DL systems operate as a black box (e.g., a device defined by inputs and outputs that performs an operation without anyone's knowledge of its internal workings). Accordingly, when a trained CNN obtains malware and generates a classification (e.g., "non-malware" or "malware"), it is not apparent how the classification was made. Accordingly, tuning and/or retraining a CNN based on misclassifications (e.g., classifying a "non-malware" image as a "malware") is difficult because there is no understanding of what elements of an input caused the misclassification.

Explainability is a protocol that provides understanding as to how an DL system/model generated an output. For example, if a DL system is processing an image to generate an output (e.g., an answer to a question), explainability identifies the parts of the image that the DL system focused on to generate the output. Explainability may be implemented using gradient weighted class activation report (grad-CAM), local interpretable model-agnostic explanations (LIME), and/or any other explainability protocol. Examples disclosed herein add explainability to the malware classification model to provide explainability for identifying misclassification, model drift, and/or adversarial attacks that may occur with respect to a model FIG. 1 is an example environment 100 including an example deep learning (DL) training server 102, an example network 104, and an example processing device 106. The example processing device 106 includes an example DL model 108 and an example adversarial attack detector 110. Although the example environment 100 is described in conjunction with a malware classification model, the environment 100 may be used in conjunction with any type of classification model (e.g., deepfake classification model, tumor classification model, natural language processing model, etc.)

The DL training server 102 of FIG. 1 trains the DL model based on a dataset of pre-classified malware. For example, the DL training server 102 may utilize 10,000 files that have already been correctly identified as "non-malware" or "malware." The DL training server 102 may utilize all or part of the dataset to train the DL model to learn to classify files based on the characteristics of the file and corresponding classification in the known data set. In some examples, the DL training server 102 receives feedback (e.g., reports corresponding to classifications and corresponding explainability reports) from the example processing device 106 after the adversarial attack detector 110 has performed classifications locally based on the trained model. The DL training server 102 may utilize the feedback and/or provide the feedback to a user to further tune the malware classification model.

In some examples, the DL training server 102 of FIG. 1 may utilize a first portion of the dataset initially and utilize classification and/or misclassification of a second portion of the dataset to modify and/or otherwise tune the initial model to increase the accuracy of the model. In some examples, the DL training server 102 may prompt a user to identify main features as to reasons for the misclassification. For example, the DL training server 102 may include a user interface to display explainability data corresponding to a misclassified file and prompt the user to provide feedback as to a possible cause of the misclassification based on the explainability report. Additionally or alternatively, the example DL training server 102 may processes explainability data generated by the adversarial attack detector 110 during training to identify common characteristics of malware files and/or non-malware files. In some examples, when the DL training server 102 receives information corresponding to misclassified malware, the DL training server 102 may determine how the malware was misclassified by comparing the explainability report of the misclassified malware to the common characteristics of non-malware and malware. The example DL training server 102 may use the determination of how the malware was misclassified to further tune/train the malware classification model.

In some examples, the DL training server 102 of FIG. 1 introduces non-differentiable algorithms into the trained misclassification model to defend the malware classification model against gradient-based adversarial attacks. The example DL training server 102 introduces the non-differentiable algorithms by replacing the final X layers (e.g., convolution layers) of the trained misclassification model with tree-based structures (e.g., regression trees, boosted trees, etc.), such that the final output of the final malware classification model is based on voting between sub trees. The determination of how many layers to replace with tree-based structures is further described below in conjunction with FIG. 2. The gradient cannot be computed when convolution layers of the model are replaced with tree-based structures. Thus, replacing the last X layers with tree-based structures causes the malware classification model to not be differentiable, thereby protecting the final malware classification model from the transferability of adversarial attacks and white-box attacks (e.g., where the attacker has access to the parameters of the malware classification model).

The protocol for selecting the X number of layers to be replaced in further described below in conjunction with FIG. 2. Additionally or alternatively, the example DL training server 102 performs a design of experiments (DOE) protocol on the trained malware classification model to identify the individual and/or interactive effects of various factors that can be observed from the trained malware classification model. The example DL training server 102 generates a DOE equation corresponding to the factors. In this manner, the example adversarial attack detector 110 can perform a reverse DOE protocol analysis and compare the results of the reverse DOE with the DOE equation generated by the DL training server 102 to identify drift and/or an adversarial attack.

The example network 104 of FIG. 1 is a system of interconnected systems exchanging data. The example network 104 may be implemented using any type of public or private network such as, but not limited to, the Internet, a telephone network, a local area network (LAN), a cable network, and/or a wireless network. To enable communication via the network 104, the example processing device 106 and/or the DL training server 102 includes a communication interface that enables a connection to an Ethernet, a digital subscriber line (DSL), a telephone line, a coaxial cable, or any wireless connection, etc.

The example processing device 106 of FIG. 1 may be a computer, a laptop, a tablet, a smart phone, a personal processor, a server, and/or any other type of processing device. The example processing device 106 obtains an executable corresponding to how to train a model (e.g., how to adjust the weights of neurons in a DL and how many of the final of layers to replace with a tree-based structure) to implemented the trained malware classification model from the example DL training server 102 via the example network 104 and provides feedback to the example DL training server 102 based on the results of a classification (e.g., identifying whether a file is "non malware" or "malware").

The example DL model 108 of FIG. 1 is configured to operate according to the trained malware classification model generated by the example DL training server 102. For example, the example malware classification model may obtain an executable from the example DL training server 102 identifying how to implement the trained model (e.g., weights for neurons in a CNN) as well as how to replace the final X layers with a tree-based structure. The example DL model 108 executes the executable to implement the trained malware classification model. The example DL model 108 may be a machine learning model, a deep learning model, a neural network (e.g., CNN), and/or any other type of model and/or network. Once implementing the trained malware classification model, the example DL model 108 obtains input files at the processing device 106 and performs a classification identifying whether the input file is non-malware or malware. The example DL training server 102 may generate an output that corresponds to whether the input malware is non-malware or malware. The example DL model 108 outputs the classification prediction for the input malware to the adversarial attack detector 110.

The adversarial attack detector 110 of FIG. 10 processes the DL model 108 and the results of the DL model 108 to access model drift and defend against adversarial attacks. For example, the adversarial attack detector 110 performs a reverse DOE to consider an appropriate fraction to fit and an appropriate design that does not confound the desired effects in the fraction. The adversarial attack detector 110 performs the reverse DOE protocol analysis to define the combination of features that were used by the trained malware classification model in a reverse DOE equation. The adversarial attack detector 110 compares the reverse DOE equation to the DOE equation generated by the DL training server 102. The result of the reverse DOE reveals whether the output classification for a particular classification is differently influenced by some factors than any single observation previously observed during training. Accordingly, the example adversarial attack detector 110 determines the model drift has occurred and/or that an adversarial attack has occurred when the DOE question differs from the reverse DOE equation by a threshold amount. Additionally or alternatively, the example adversarial attack detector 110 includes an explainability protocol (e.g., grad-CAM, LIME, etc.) to analyze the malware classification model's classification and provide a report of the most import features that the malware classification used in outputting the classification. The example adversarial attack detector 110 generates a report including the classification and the explainability report and transmits the report to the example DL training server 102. The explainability report provides a visual explanation by linking features with the classification results to monitor misclassifications (e.g., false positive and/or false negatives). The example adversarial attack detector 110 may transmit a report including one or more classifications, reverse DOE equation(s) corresponding to the classification(s), and/or explainability reports to the example DL training server 102 for further tuning of the malware classification model.

In some examples, the adversarial attack detector 110 of FIG. 1 may be implemented in the DL training server 102. For example, the adversarial attack detector 110 may be utilized during the testing process to provide feedback when testing the malware classification model. In such an example, the DL training server 102 may include a database (e.g., memory) including a training dataset of one thousand files. However, any other number of files in the training dataset may additionally or alternatively be used. Some of the files are non-malware while others are malwares, the classifications (e.g., non-malware vs. malware) are known to the DL training server 102 prior to training. The DL training server 102 may initially train a malware classification model using seven hundred of the files and, in some examples, replaces the final X layers with a tree-based structured. The determination of how many layers to replace with tree-based structures is further described below in conjunction with FIG. 2. Once the initial training is complete, the initially trained malware classification model is implemented in the adversarial attack detector 110. Once implemented, 100 of the remaining known files from the training dataset can be input into the initially trained model for testing of the trained model. In this manner, the DL training server 102 can compare the outputs of the initially trained model to the known classifications to identify misclassifications (e.g., when the output classification for the input malware does not match the known classification). The example adversarial attack detector 110 provides information to a user or the DL training server 102 to determine how/why the misclassifications occurred based on the explainability report. In this manner, the DL training server 102 can tune the initially trained malware classification model based on the feedback (e.g., the explainability reports of any misclassified malware). This process may continue any number of times (e.g., using any number of the two hundred remaining known files from the training dataset) to further tune the malware classification model before deploying to the example processing device 106.

In some examples, the DL training server 102 of FIG. 1 deploys the adversarial attack detector 110 to the example processing device 106. For example, a user of the processing device 106 may download the adversarial attack detector 110 from the DL training server 102. In another example, the DL training server 102 may automatically deploy the adversarial attack detector 110 to the processing device 106 via the network 104 (e.g., as part of a software upgrade and/or software update). In this manner, the example processing device 106 can identify adversarial attacks and/or drift locally after the DL training server 102 has deployed the adversarial attack detector 110 to the processing device 106.

Figure 2:
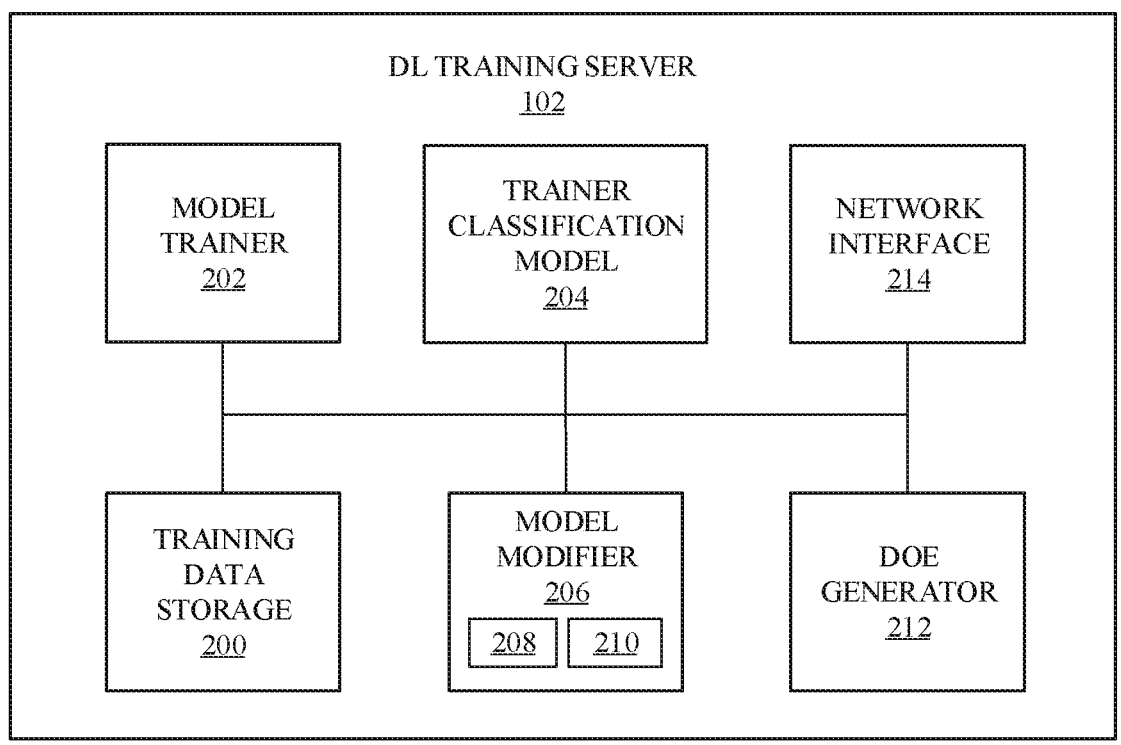
FIG. 2 is a block diagram of an example deep learning training server of FIG. 1

FIG. 2 is block diagram of an example implementation of the DL training server 102 of FIG. 1. The example DL training server 102 includes an example training data storage 200, an example model trainer 202, an example trainer classification model 204, an example model modifier 206, an example difference determiner 208, an example comparator 210, an example DOE generator 212, and an example network interface 214. Although the DL training server 102 is described in conjunction with a malware classification model, the DL training server 102 may be used in conjunction with any type of classification model (e.g., deepfake classification model, tumor classification model, natural language processing model, etc.)

The example training data storage 200 of FIG. 2 stores a set of files that have known classifications (e.g., are known to be non-malware or malware). The training data storage 200 may be updated with additional data as new forms or types of malware become identified. The stored set of files with known classifications may be used by the example model trainer 202 to train and/or test a malware classification model.

The example model trainer 202 of FIG. 2 trains the example trainer classification model 204 to classify files as malware or non-malware based on some or all of the example files of known classification stored in the example training data storage 200. For example, the model trainer 202 trains and/or tests the trainer classification model 204 using the files and corresponding known classifications. The example model trainer 202 may train the trainer classification model 204 with back-propagation from cross-entropy loss. Cross entropy (e.g., log-loss) includes calculating the difference between actual labels and predicted labels of any given data to reduce the deviation of predicted labels to true labels. Backpropagation trains a machine learning classifier by calculating the gradient of a loss function (e.g., by calculating the binary cross-entropy loss on every iteration with respect to the weights of the model). For consecutive iterations, the gradient of the loss function is minimized. The process may be repeated (e.g., for 40 epochs) to achieve a desired performance. Once the trainer classification model 204 has been trained and/or modified (e.g., with a tree-based structure), the example network interface 214 deploys the classification model to be implemented by the example DL model 108 of FIG. 1 (e.g., by transmitting an executable that can be executed by the DL model 108 to implement the trainer classification model 204). The example trainer classification model 204 may be an AI model, a ML model, a DL model, a neural network (e.g., CNN), and/or any other type of model.

The example model modifier 206 of FIG. 2 modifies the trainer classification model 204 once training/testing is complete. The example model modifier 206 modifies the trainer classification model 204 by replacing the last X number of layers of the trainer classification model 204 with a tree-based structure. Each layer of the trainer classification model 204 corresponds to a decision that leads to the ultimate output of the model. The more layers, the more accurate the result of the model is. However, the amount of change from one layer to the next is much smaller in the final layers of a model. Accordingly, the example model modifier 206 selects X to be a number of layers that ensures a threshold amount of accuracy while providing the security of including as many tree-based structures. The modified model provides a stronger non-differentiable classifier as more layers replaced with tree-based structures correspond to a stronger defense against gradient based attacks. The example model modifier 206 utilizes the example difference determiner 208 and the example comparator 210 to determine how many layers can be replaced with tree-based structures to balance accuracy of the classification model with the strength of defending against gradient based attacks.

To determine which layers to replace with tree-based structures, the example model modifier 206 of FIG. 2 inputs (e.g., provides) a file into the example trainer classification model 204 after training/testing. Additionally, the model modifier 206 adds an adversarial perturbation to the input and inputs the perturbed input into the model modifier 206. The example difference determiner 208 determines the difference (e.g., a Euclidean distance) between the input and the perturbed input at each layer of the trainer classification model 204. After the Euclidean distances between the two inputs have been determined for the layers, the difference determiner 208 determines a difference between the determined Euclidean distance at each layer with the determined Euclidean distance of the layer immediately subsequent to each layer. As described above, because the amount of change between layers is smaller at later layers, the distance between the Euclidean distance of a layer to the Euclidean distance of a layer immediately subsequent will decrease with the depth of the layers.

The example comparator 210 of FIG. 2 compares (A) the determined difference between Euclidean distances of each layer to a layer immediate precedent to (B) a threshold distance. The threshold distance corresponds to the amount of desired accuracy for classification of the trainer classification model 204. The threshold distance may be selected by a user and/or administrator. The example model modifier 206 identifies the X number of layers based on the Euclidean distances that are less than the threshold distance (e.g., determined by the example comparator 210). Once the comparator 210 determines the X number of layers that satisfy the distance threshold, the example model modifier 206 replaces the X number of layers of the trainer classification model 204 with tree-based structures. The tree-based structures are non-differential classifiers. In this manner, the non-differential algorithms make use of the feature extractor from deep learning and the expressive capacities of regression trees to limit the effect on accuracy and add more interpretability to the malware classification model.

The example DOE generator 212 of FIG. 2 generates a DOE equation based on the trainer classification model 204 after training and/or modifying. The DOE equation generated by the DOE generator 212 indicates the factor(s) (e.g., feature(s)) that contribute to the output generated by the trainer classification model 204. For example, the DOE generator 212 may vary the input factors according to a systematic plan. The example DOE generator 212 may than analyze the outputs using statistical techniques to generate an equation that indicates the contributions of each individual factor and/or combination of factors towards the classification/output. Alternatively, the example DOE generator 212 may generate the DOE equation using any type of DOE protocol.

The example network interface 214 of FIG. 2 transmits data to and/or receives data from the example processing device 106 via the example network 104 (e.g., when the adversarial attack detector 110 is implemented in the example processing device 106). For example, the network interface 214 may transmit trained model data (e.g., an executable that includes a set of weights to apply to the neurons of a DL algorithm to implement the trained model) to the example processing device 106. The trained model data corresponds to instructions to implement a malware classification model based on training and/or modifying that occurred at the DL training server 102. Additionally, the network interface 214 may receive reports to the example processing device 106. For example, when the example adversarial attack detector 110 classifies obtained malware, the adversarial attack detector 110 may generate a report identifying or otherwise including the input file, the classification (e.g., non-malware/malware and/or the classification score), the explainability report resulting from the classification, reverse DOE equation, drift information, and/or adversarial attack information. The example network interface 214 can transmit the report to the DL training server 102 to provide feedback for subsequent training and/or modifying of the malware model.

Figure 3:
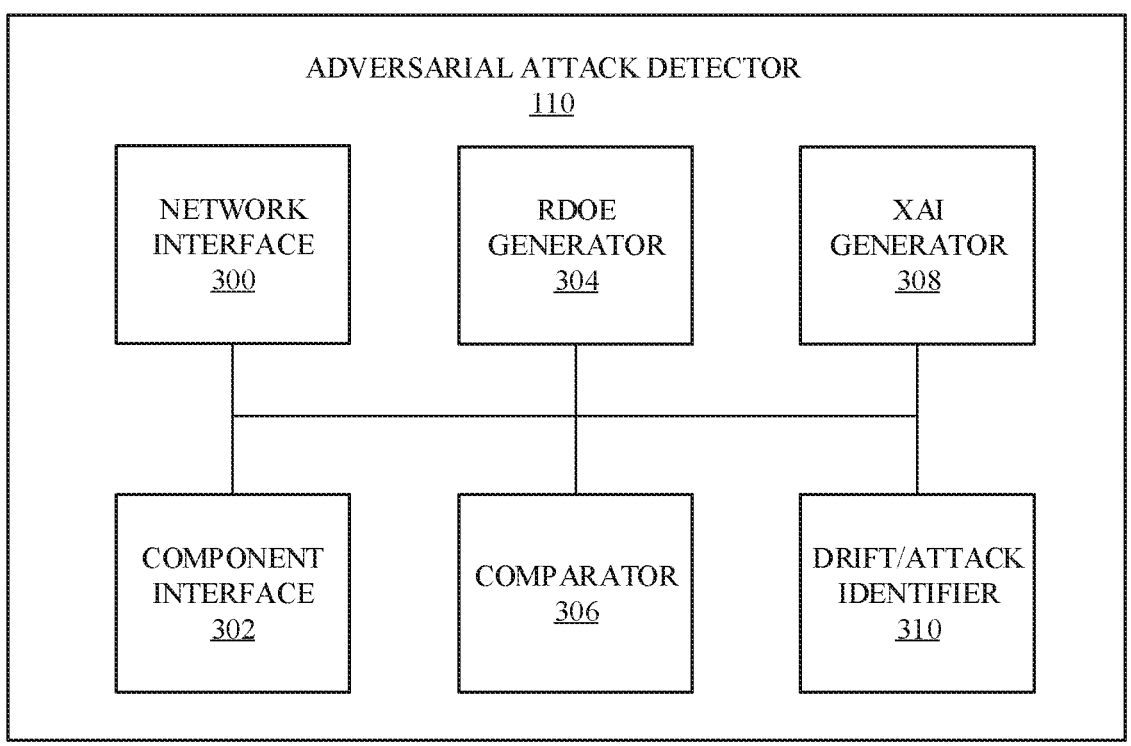
FIG. 3 is a block diagram of an example adversarial attack detector of FIG. 1.

FIG. 3 is a block diagram of an example implementation of the adversarial attack detector 110 of FIG. 1. The example adversarial attack detector 110 includes an example network interface 300, an example component interface 302, an example reverse DOE (RDOE) generator 304, an example comparator 306, an example explainability (XAI) generator 308, and an example drift/attack identifier 310. Although the adversarial attack detector 110 is described in conjunction with a malware classification model, the adversarial attack detector 110 may be used in conjunction with any type of classification model (e.g., deepfake classification model, tumor classification model, natural language processing model, etc.)

The example network interface 300 of FIG. 2 transmits and/or receives data to/from the example DL training server 102 via the example network 104 (e.g., when the adversarial attack detector 110 is implemented in the example processing device 106). For example, the network interface 300 may receive trained model data (e.g., an executable that includes a set of weights to apply to the neurons of a DL algorithm to implement the trained model and/or which layers to replace with tree-based structures) from the example DL training server 102. The trained model data corresponds to instructions to implement a malware classification model based on training/testing that occurred at the DL training server 102. Additionally, the network interface 300 may transmit a report to the example DL training server 102. For example, when the example DL model 108 classifies obtained files and the explainable processor 110 performs the RDOE protocol and the explainability protocol, the adversarial attack detector 110 may generate a report identifying or otherwise including the input file, the classification (e.g., non-malware or malware), RDOE information corresponding to the classification, and/or the explainability report resulting from the classification. The example network interface 300 transmits the report to the DL training server 102 to provide feedback for subsequent training and/or modifying of the malware classification model.

The example component interface 302 of FIG. 2 transmits and/or receives data to/from the example DL model 108 and/or the DL training server 102 (e.g., when the adversarial attack detector 110 is implemented in the example DL training server 102). For example, the component interface 302 may receive files that are stored in and/or received by the example processing device 106 for malware classification. Additionally, the example component interface 302 may deploy a received executable to structure the DL model 108 to implement the trained malware classification model generated by the example DL training server 102. When the example adversarial attack detector 110 is implemented in the DL training server 102, the component interface 302 may interface with the trainer classification model 204 to provide feedback (e.g., RDOE information and/or explainability reports) to the example DL training server 102. Additionally, when the adversarial attack detector 110 is implemented in the DL training server 102, the component interface 302 may interface with the components of the DL training server to obtain an DOE equation corresponding to the trained malware classification model. In some examples, the component interface 302 may interface with storage and/or memory of the example processing device 106 and/or DL training server 102 to store reports.

The example RDOE generator 304 performs a reverse DOE protocol analysis to generate a reverse DOE equation that can be compared to the DOE equation performed by the example DL training server 102 to identify drift and/or adversarial attacks. In some examples, the example RDOE generator 304 generates the RDOE equation by retrospectively selecting and fitting fractional factorial design. For example, the RDOE generator 304 considers an appropriate fraction to try to fit observations with features and the RDOE generator 304 generates a reverse DOE equation indicating which features or combination of feature contributed to a classification performed by the DL model 108.

The example comparator 306 of FIG. 3 compares the RDOE equation generated by the example RDOE generator 304 with the DOE equations generated by the DOE generator 212 of the example DL training server 102. The comparator 306 compares the RDOE equation with the DOE equation to determine whether the output of a particular classification is differently influenced by some factors that any single observation previously observed during the training/testing of the malware classification model at the DL training server 102.

The example drift/attack identifier 310 of FIG. 3 identifies concept/model drift and/or an adversary attack based on the result of the comparison of the DOE equation to the RDOE equation. If the drift/attack identifier 310 determines that the RDOE equation differs from the DOE equation by more than a threshold amount (e.g., based on the output of the comparator 306), the example drift/attack identifier 310 identifies that at least one of model drift and/or an adversarial attack has occurred.

The example XAI generator 308 of FIG. 3 performs an explainability protocol (e.g., grad-CAM, LIME, and/or any other type of explainability/interpretability protocol) to provide explainability as to how the example DL model 108 generated a malware classification. For example, the example XAI generator 308 may be implemented by LIME to generate an explanation reflecting the behavior of the malware classification model around the instance being predicted. Implementing LIME allows the ability explain any model without needing to "peek" into the model (e.g., LIME is model agnostic which means that it can be applied to any machine learning or deep learning model). Accordingly, the example XAI generator 308 generates explainability from the DL model 108 to identifying the features and/or factors that were important to the DL model 108 when generating a classification. In this manner, if the classification is incorrect, information may be sent to the example DL training server 102 to update the malware classification model based on the misclassification information and explainability. For example, a processor or a user may determine the reasons for the misclassification and may update the malware classification model to adjust how the model classifies malware based on the reasons for the misclassification (e.g., by changing the weights in a DL model to emphasis or deemphasis particular features corresponding to the reason for misclassification). Additionally, the example XAI generator 308 may perform the explainability protocol during testing of the example trainer classification model 204, so that the model trainer 202 can tune the malware classification model during training. An example of an XAI report is further described below in conjunction with FIG. 7.

While an example manner of implementing the DL training server 102 of FIG. 1 is illustrated in FIG. 2 and the example adversarial attack detector 110 is illustrated in FIG. 3, one or more of the elements, processes and/or devices illustrated in FIG. 1 may be combined, divided, re-arranged, omitted, eliminated and/or implemented in any other way. Further, the example trained data storage 200, the example model trainer 202, the example trainer classification model 204, the example model modifier 206, the example difference determiner 208, the example comparator 210, the example DOE generator 212, the example network interface 214 and/or, more generally, the example DL training server 102 of FIG. 2 and the example network interface 300, the example component interface 302, the example RDOE generator 304, the example comparator 306, the example XAI generator 308, the example drift/attack identifier 310, and/or, more generally, the example adversarial attack detector 108 of FIG. 3 may be implemented by hardware, software, firmware and/or any combination of hardware, software and/or firmware. Thus, for example, any of the example trained data storage 200, the example model trainer 202, the example trainer classification model 204, the example model modifier 206, the example difference determiner 208, the example comparator 210, the example DOE generator 212, the example network interface 214 and/or, more generally, the example DL training server 102 of FIG. 2 and the example network interface 300, the example component interface 302, the example RDOE generator 304, the example comparator 306, the example XAI generator 308, the example drift/attack identifier 310, and/or, more generally, the example adversarial attack detector 108 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example trained data storage 200, the example model trainer 202, the example trainer classification model 204, the example model modifier 206, the example difference determiner 208, the example comparator 210, the example DOE generator 212, the example network interface 214, and/or, more generally, the example DL training server 102 of FIG. 2 and the example network interface 300, the example component interface 302, the example RDOE generator 304, the example comparator 306, the example XAI generator 308, the example drift/attack identifier 310, and/or, more generally, the example adversarial attack detector 108 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example malware detection system 100 of FIG. 1 may include one or more elements, processes and/or devices in addition to, or instead of, those illustrated in FIGS. 1, 2 and/or 3, and/or may include more than one of any or all of the illustrated elements, processes and devices. As used herein, the phrase "in communication," including variations thereof, encompasses direct communication and/or indirect communication through one or more intermediate components, and does not require direct physical (e.g., wired) communication and/or constant communication, but rather additionally includes selective communication at periodic intervals, scheduled intervals, aperiodic intervals, and/or one-time events.

Figure 4:
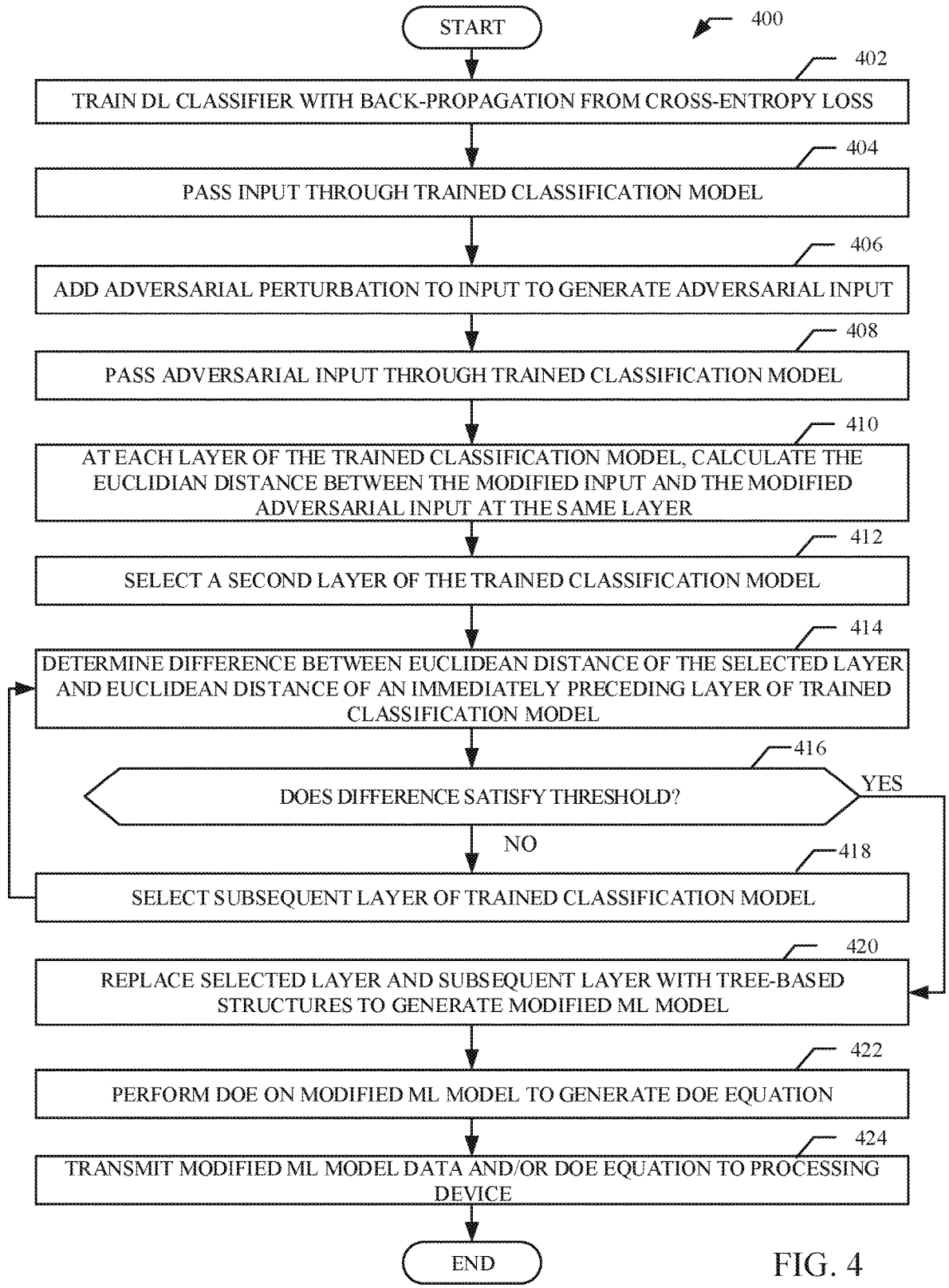
FIG. 4 is a flowchart representative of machine readable instructions which may be executed to implement the example deep learning training server of FIGS. 1 and/or 2 to train a malware classification model.

Flowcharts representative of example hardware logic, machine readable instructions, hardware implemented state machines, and/or any combination thereof for implementing the DL training server 102 and the adversarial attack detector 110 of FIGS. 1, 2, and/or 3 are shown in FIG. 4, 5, 6A, 6B. The machine readable instructions may be one or more executable programs or portion(s) of an executable program for execution by a computer processor such as the processor 812, 912 shown in the example processor platform 800, 900 discussed below in connection with FIGS. 8 and 9. The program may be embodied in software stored on a non-transitory computer readable storage medium such as a CD-ROM, a floppy disk, a hard drive, a DVD, a Blu-ray disk, or a memory associated with the processor 812, 912, but the entire program and/or parts thereof could alternatively be executed by a device other than the processor 812, 912 and/or embodied in firmware or dedicated hardware. Further, although the example program is described with reference to the flowcharts illustrated in FIGS. 4, 5, 6A, and 6B many other methods of implementing the example DL training server 102 and/or the example adversarial attack detector 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 4, 5, 6, and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission malware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is an example flowchart 400 representative of machine readable instructions that may be executed to implement the example DL training server 102 of FIG. 2 to modify a trained classification model to replace layers of the classification model with tree-based structures. Although the flowchart 400 is described in conjunction with the example DL training server 102 of FIG. 2, the flowchart 400 may be used in conjunction with any type of model training server.

At block 402, the example model trainer 202 trains the trainer classification model 204 with back-propagation from cross-entropy loss. For example, the model trainer 202 utilizes the files with known classifications stored in the example training data storage 200 to train the example trainer classification model 204. In some examples, the model trainer 202 utilizes a portion of files in the example training data storage 200 to train the trainer classification model. In such examples, the model trainer 101 uses other portions of the files to test the initially trained trainer classification model 204 to tune the model based on misclassification (e.g., when a file of a known classification is passed through the trainer classification model 204 resulting in a classification that is different than the known classification for the file) during training.

At block 404, the example model modifier 206 passes (e.g., provides) an input file into the trained trainer classification model 204. At block 406, the example model modifier 206 adds an adversarial perturbation to the input file to generate an adversarial input file. At block 408, the example model modifier 206 passes (e.g., provides) the adversarial input into the trained trainer classification model 204. At block 410, the example difference determiner 208 calculates the Euclidean distance between the modified input and the modified adversarial input at each layer of the trainer classification model 204.

At block 412, the example model modifier 206 select the second layer (e.g., convolution layer) of the trained trainer classification model 204. At block 414, the example difference determiner 208 determines the difference between the Euclidean distance of the selected layer and the Euclidean distance of the immediately preceding layer of the trained trainer classification model 204. As described above in conjunction with FIG. 2, the difference between the Euclidean distance between two neighboring layers will decrease at later layers of a classification model.

At block 416, the example comparator 210 compares the difference determined at block 414 to a threshold to determine at which layer does the difference satisfy the threshold. The threshold may be based on user and/or administrator preferences (e.g., based on how much accuracy versus durability of the classification model is desired). If the example comparator 210 determines that the difference does not satisfy the threshold (block 416: NO), the model modifier 206 selects a subsequent layer (block 418) and control returns to block 414 until the difference satisfies the threshold. If the example comparator 210 determines that the difference satisfies the threshold (block 416: YES), the example model modifier 206 replaces the selected layer and subsequent layer(s) with a tree-based structure(s) to generate the modified classification model (block 420). As described above, replacing the layers with tree-based structure(s) causes the malware classification model to not be differentiable, thereby protecting the final malware classification model from the transferability of adversarial attacks and white-box attacks (e.g., where the attacker has access to the parameters of the malware classification model).

At block 422, the example DOE generator 212 performs a DOE protocol on the modified malware classification model (e.g., the modified trainer classification model 204) to generate a DOE equation. As descried above in conjunction with FIG. 2, the DOE generator 212 generates the equation by analyzing the outputs of the trained classification model (e.g., the trained trainer classification model 204) using statistical techniques to generate an equation that indicates the contributions of each individual factor and/or combination of factors towards the classification/output. The DOE equation indicates the factor(s) (e.g., feature(s)) that contribute to the output generated by the trainer classification model 204 and is used by the example adversarial attack detector 110 after deployment to determine when drift and/or an adversary attack has occurred. At block 424, the example network interface 214 transmits the modified ML model data (e.g., an executable) and/or DOE equation to the example processing device 106 via the network 104.

Figure 5:
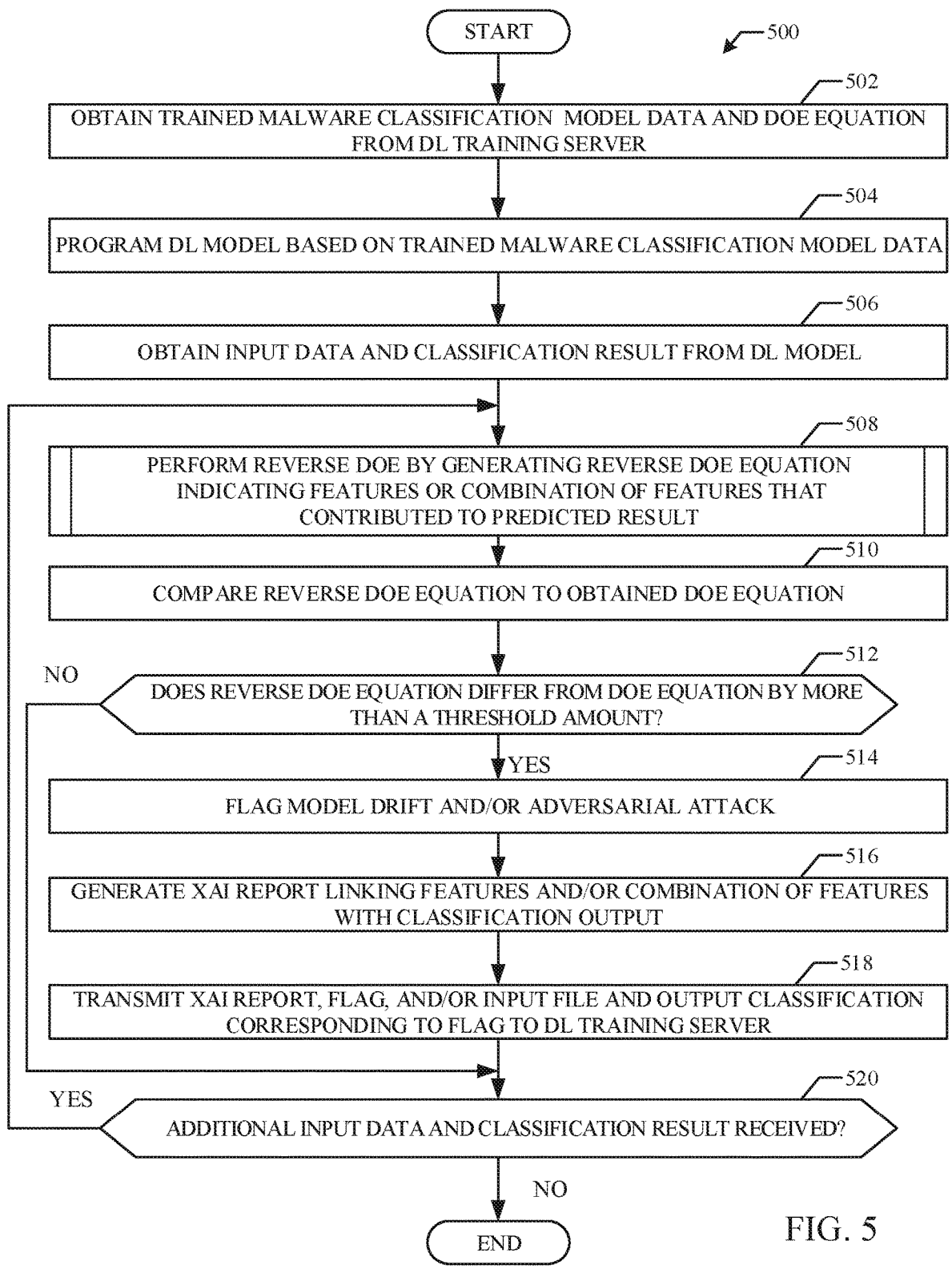
FIG. 5 is a flowchart representative of machine readable instructions which may be executed to implement the example adversarial attack detector of FIGS. 1 and/or 3 to identify model drift and/or adversarial attacks.

FIG. 5 is an example flowchart 500 representative of machine readable instructions that may be executed to implement the example adversarial attack detector 110 of FIG. 3 to determine when an adversarial attack and/or model drift has occurred for a trained malware classification model. Although the flowchart 500 is described in conjunction with the example adversarial attack detector 110 of FIG. 3, the flowchart 500 may be used in conjunction with any type of adversarial attack detector. Although the flowchart 500 is described in conjunction with implementing a trained model after deployment (e.g., after training/testing), the flowchart 500 may be used in conjunction with the testing portion of training (e.g., when a partially or initially trained model is deployed and files with known classifications are used to test the partially or initially trained model to (i) identify misclassifications and/or (ii) tune the accuracy of the model).

At block 502, the example network interface 300 obtains trained malware classification model data and a DOE equation from the example DL training server 102. For example, the trained malware classification model data may be an executable identifying how to train the DL model 108 to operate as the trained malware classification model. As described above, the DOE equation indicates the factor(s) (e.g., feature(s)) that contribute to the output generated by the trainer classification model 204.

At block 504, the example component interface 302 interfaces with the DL model 108 to program the DL model 108 based on the trained malware classification model data (e.g., tunes the weights of the DL model 108 to implement the trained malware classification model). At block 506, the example the example RDOE generator 304 obtains input data (e.g., an input file that was classified by the example DL model 108) and the classification result (e.g., the output) of the DL model 108. For example, the DL model 108 may obtain an input file and classify the file as malware or non-malware.

At block 508, the example RDOE generator 304 performs a reverse DOE protocol analysis to generate a reverse DOE equation indicating features and/or a combination of features that contributed to classification result, as further described below in conjunction with FIGS. 6A and 6B. At block 510, the example comparator 306 compares the reverse DOE equation to the obtained DOE equation. If there is little or no difference between the reverse DOE equation and the DOE equation, then the DL model 108 is operating the trained malware classification model. However, if the reverse DOE equation and the DOE equation differ by more than a threshold amount, model drift and/or an adversarial attack may have occurred.

At block 512, the example comparator 306 determines if the reverse DOE equation differs from the DOE equation by more than a threshold amount. The comparator 306 may perform a Euclidean distance and/or any other type of comparison to determine the amount of difference. The threshold amount may be selected by a user and/or administrator. If the example comparator 306 determines that the reverse DOE equation does not differ from the DOE equation by more than a threshold amount (block 512: NO), control continues to block 520. In some examples (e.g., such as during training/testing), control may continue to block 516 to generate an XAI report that the example DL training server 102 may utilize for tuning of the malware classification model (e.g., such as when misclassification occur during testing).

If the example comparator 306 determines that the reverse DOE equation differs from the DOE equation by more than a threshold amount (block 512: YES), the example drift/attack identifier 310 flags the DL model 108 as corresponding to model drift and/or an adversarial attack (block 514). At block 516, the example XAI generator 308 generates an XAI report linking features and/or a combination of features with the classification output. For example, the XAI generator 308 may implement a LIME protocol to identify which features of the input file were most important to the DL model 108 when classifying the input file.

At block 518, the example network interface 300 (e.g., when the adversarial attack detector 110 is implemented in the processing device 106) and/or the example component interface 302 (e.g., when the adversarial attack detector 110 is implemented in the DL training server 102), transmits the XAI report, the flag, and/or the input file and output classification corresponding to the flag to the DL training server 102. In this manner, the example DL training server 102 processes the XAI report to retrain and/or tune the malware classification model based on information in the XAI report. At block 520, the example RDOE generator 304 determines if additional input data and corresponding classification result was received (e.g., if the DL model 108 classified an additional file). If the example RDOE generator 304 determines that additional input data and classification result were received (block 520: YES), control returns to block 508. If the example RDOE generator 304 determines that additional input data and classification result were not received (block 520: NO), the process ends.

Figure 6A:
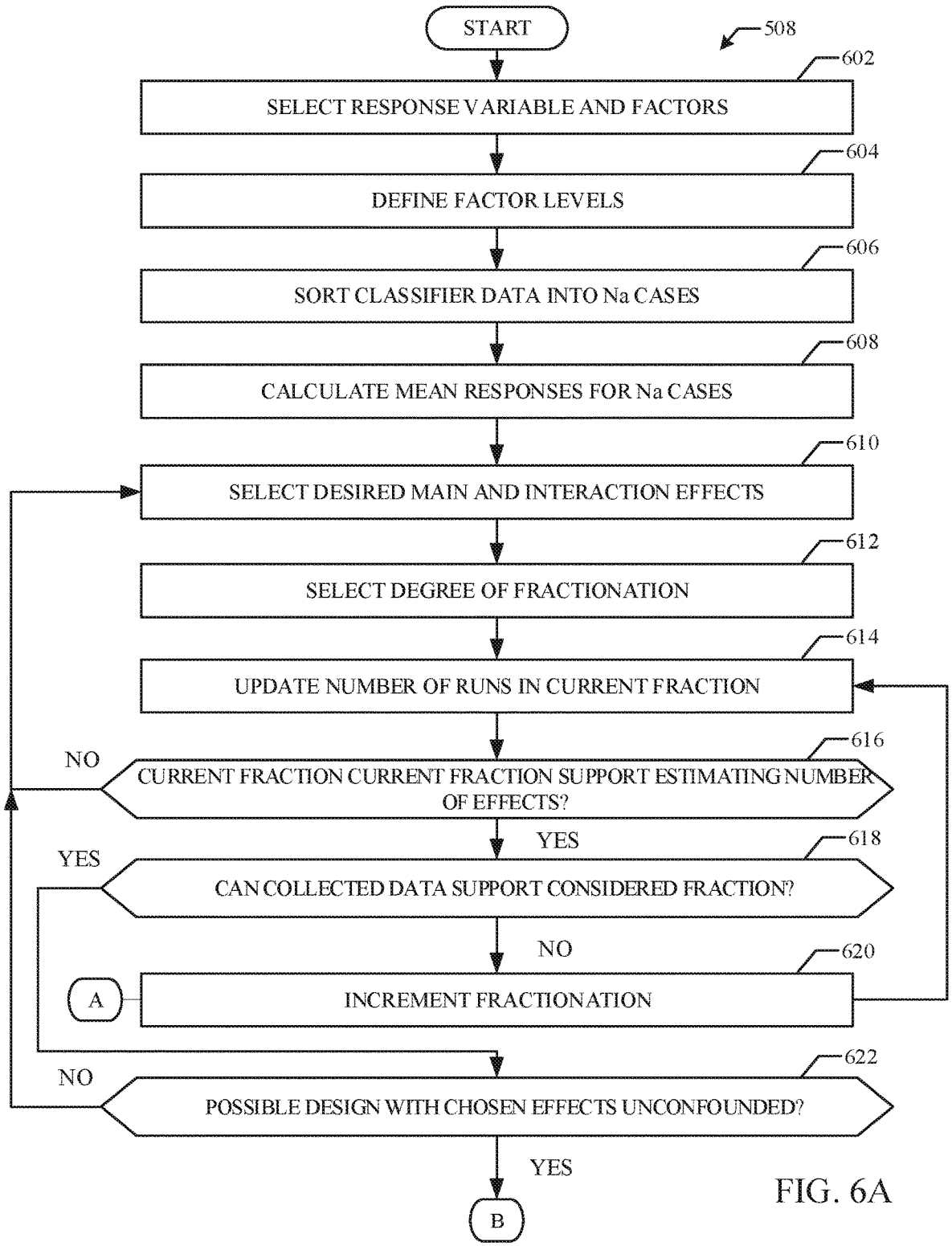
FIGS. 6A and 6B illustrate a flowchart representative of machine readable instructions which may be executed to implement the example adversarial attack detector of FIGS. 1 and/or 3 to perform reverse design of experiments.
Figure 6B:
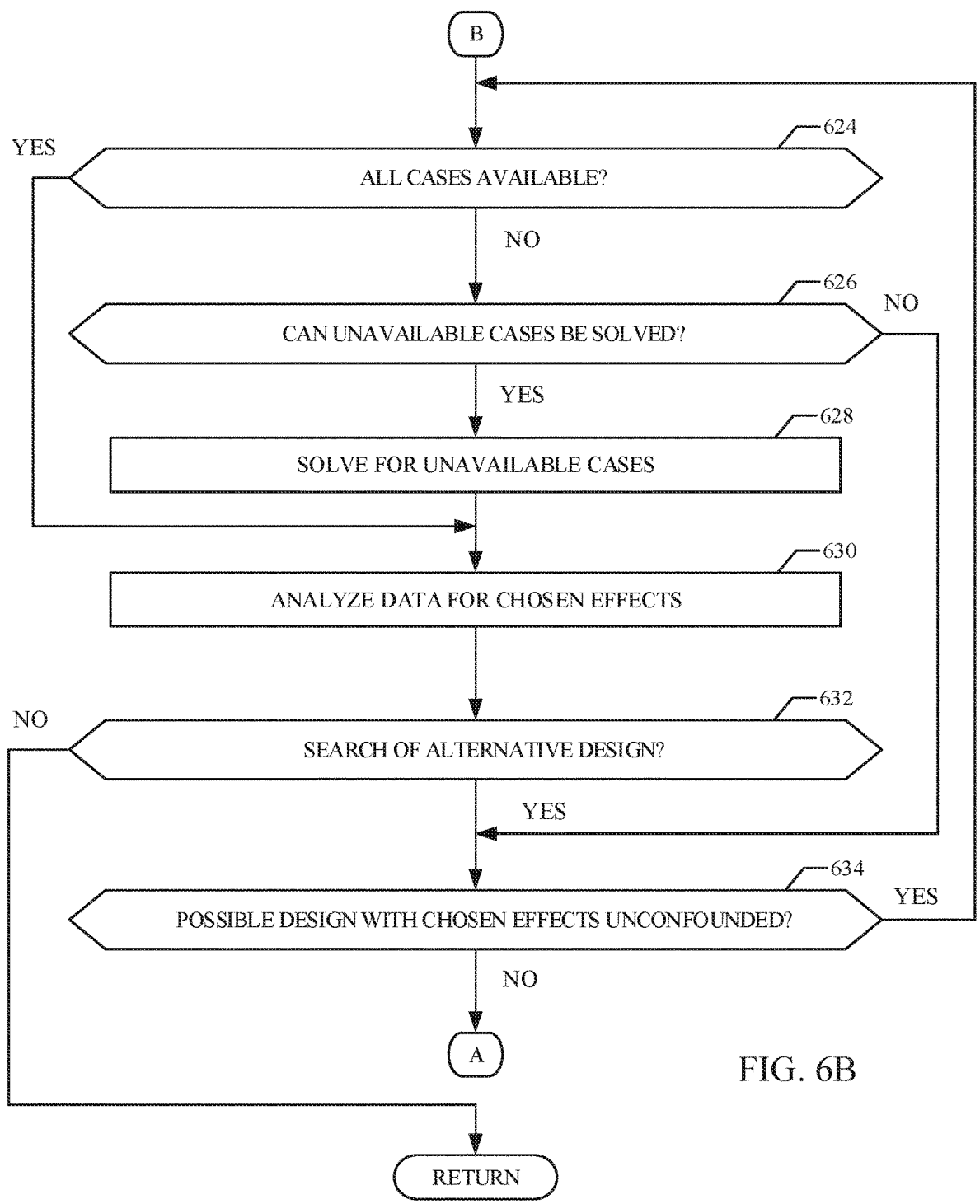

FIGS. 6A and 6B is an example flowchart 600 representative of machine readable instructions that may be executed to implement the example DL training server 102 of FIG. 3 to train and modify/tune a malware classification model. Although the flowchart 600 is described in conjunction with the example DL training server 102 of FIG. 3, the flowchart 600 may be used in conjunction with any type of AI training server.

At block 602, the example RDOE generator 304 selects a response variable (y) and factors ($x_1$ to $x_k$). The response variable and factors are fixed and extract from available data corresponding to the DL model 108 and/or the classifications of the DL model 108. At block 604, the example DOE generator 304 defines the factor levels. All input factors are suitable defined at two levels. For example, the RDOE generator 304 may arbitrarily fix the separation between high and low levels at the mid-point of the range of each factor, which depend on the data collected.

At block 606, the example RDOE generator 304 sorts the classifier data into $n_a$ cases. The RDOE generator 304 sorts each available record into separate treatment condition that it represents. The RDOE generator 304 determines the number of treatment conditions (e.g., cases) of the full $2^k$ factorial that is available. A case is available if there is at least one record belonging to that case. At block 608, the example RDOE generator 304 calculates the mean response for the $n_a$ cases. For example, the RDOE generator 304 determines the representative response value for each case by averaging the records belonging to that case.

At block 610, the example RDOE generator 304 selects the main and interaction effects ($n_e$). The desired main and interaction effects are the a priori listing of effects that are known prior to the RDOE analysis. In some examples, only main affects and/or one or two interactions may be included. At block 612, the example RDOE generator 304 selects a degree of fractionation (e.g., p). Initially, the example RDOE generator 304 selects the degree to be zero. In some examples, the RDOE generator 304 starts the search for fitting designed from the highest fraction, the full factorial. At block 614, the example RDOE generator 304 updates the number of runs in the current fraction (e.g., $n_r = 2^{k-p}$).

At block 616, the example RDOE generator 304 determines if the current fraction is able to support estimating the number of effects needed at the current fraction (e.g., is $n_r > n_e$?). One extra degree of freedom is needed for the mean or identify column. Accordingly, the example RDOE generator 304 determines if the current fraction is able to support the estimation of the number of effects needed based on whether $n_r > n_e$. If the example RDOE generator 304 determines that the current fraction is not able to support the estimating of the number of effects needed at the current fraction (block 616: NO), control returns to block 610 and different effects and/or degree of fractionation are selected.

If the example RDOE generator 304 determines that the current fraction is able to support the estimating of the number of effects needed at the current fraction (block 616: YES), the example RDOE generator 304 determines if the collected data (e.g., corresponding to a classification of the DL model 108) can support the fraction considered (block 618) (e.g., is $n_a \geq n_r$?). In some examples, the RDOE generator 304 may proceed when $n_a$ is some percentage above $n_r$.

If the example RDOE generator 304 determines that the collected data cannot support the fraction consideration (block 618: NO), the example RDOE generator 304 increments the fractionation (e.g., p=p+1) (block 620) and control returns to block 614. If the example RDOE generator 304 determines that the collected data can support the fraction consideration (block 618: YES), the example RDOE generator 304 determines if any possible designs with chosen effects be unconfounded (block 622). A design is a unique combination of cases of the full factorial. However, it is possible that the RDOE generator 304 cannot find that a design that does not confound at least two of the desired effects If such is the case, because the higher fractions have already been considered, the RDOE generator 304 reduces the number of required effects.

If the example RDOE generator 304 determines that there are not any possible designs with chosen effects unconfounded (block 622: NO), control returns to block 610 to select subsequent effects and/or degree of fractionation. If the example RDOE generator 304 determines that there are possible designs with chosen effects unconfounded (block 622: YES), the example RDOE generator 304 determines if all cases are available (block 624).

If the example RDOE generator 304 determines that all cases are available (block 624: YES), control continues to block 630. If the example RDOE generator 304 determines that all cases are not available (block 624: NO), the example RDOE generator 304 solves for the unavailable cases (block 628) (e.g., by attempting to use "lean design" method to estimate the unavailable cases). For example, the RDOE generator 304 sets the number of "free" columns (e.g., columns not estimating any of the effects) to be at least equal to the number of unavailable cases ($n_u$) (e.g., $n_u \leq n_r - n_c - 1$). Then, the RDOE generator 304 determines the $n_u$ "free" columns such that $n_u$ linearly independent equations in the $n_u$ unknown observations can be obtained and solve simultaneously.

At block 630, the example RDOE generator 304 analyzes the data for the chosen effects. For example, the RDOE generator 304 analyzes the data of the $2^{k-p}$ experiment, including any imputed values. In such an example, the RDOE generator 304 generates the RDOE equation of the form $\hat{y} = b_0 + \Sigma b_i x_i + \Sigma b_{ij} x_i x_j + \ldots$ where there are $n_c$ terms, not including the mean coefficient ($b_0$). At block 632, the example RDOE generator 304 determines whether to search for an alternative design. The determination of whether or not to search for alternative designs may be based on user and/or administrator preferences. In some examples, the RDOE generator 304 may determines to search for alternative designs with the number of records used ($r_{used}$) is below a threshold or when the mean error is high. If the example RDOE generator 304 decides to not search for an alternative design (block 632: NO), control returns to block 510 of FIG. 5.

If the example RDOE generator 304 decides to search for an alternative design (block 632: YES), the example RDOE generator 304 determines if any possible designs with chosen effects be unconfounded (block 634). If the example RDOE generator 304 determines that there are not any possible designs with chosen effects unconfounded (block 634: NO), control returns to block 620 increment the fractionation. If the example RDOE generator 304 determines that there are possible designs with chosen effects unconfounded (block 634: YES), control returns to block 624.

Figure 7:
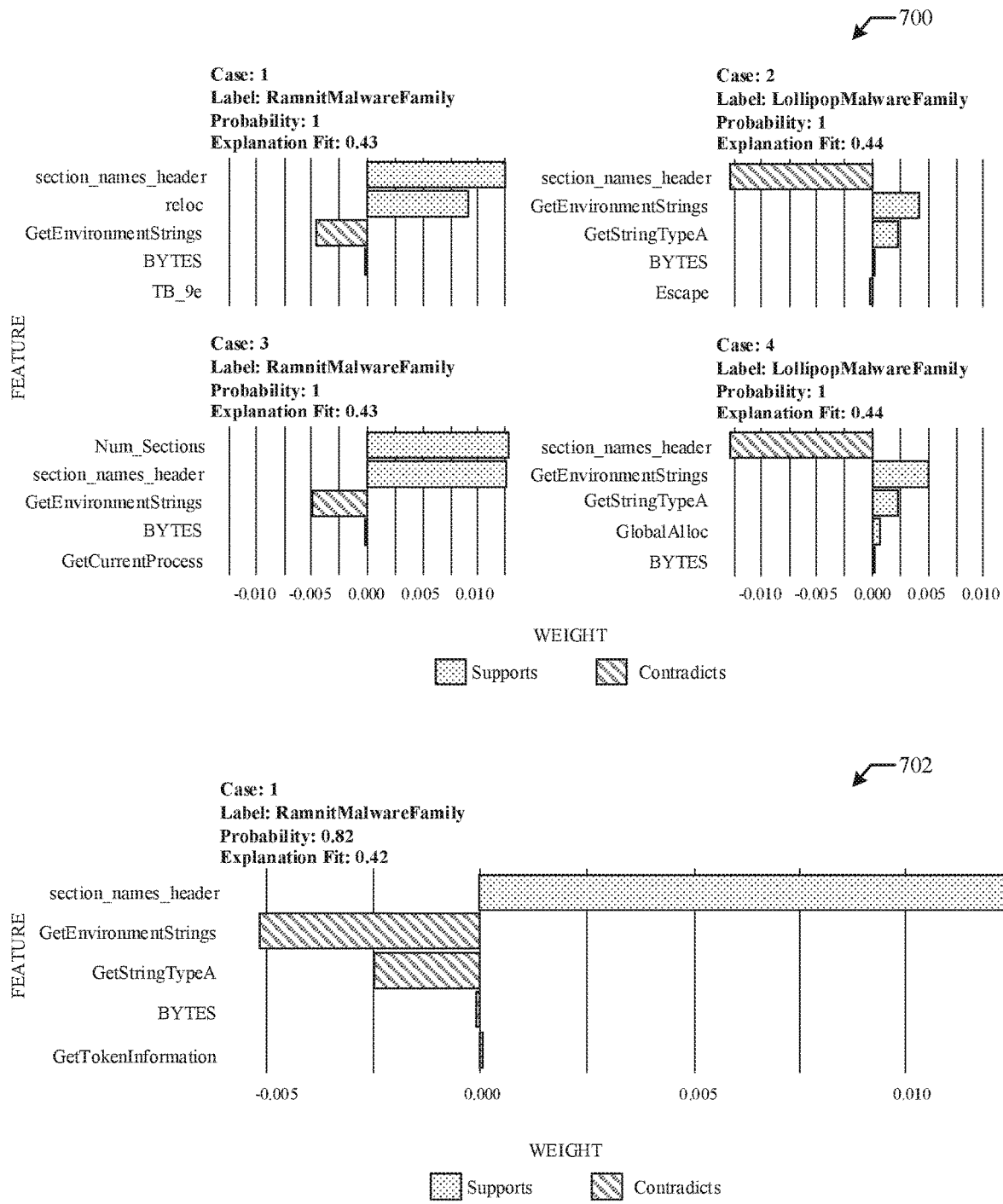
FIG. 7 illustrates example explainability reports that may be output by the example adversarial attack detector of FIGS. 1 and/or 3.

FIG. 7 illustrates example explainability reports 700, 702 that may be generated by the example adversarial attack detector 110 of FIGS. 1 and/or 3. The LIME protocol works by permuting data, calculating distance/similarity-score between the original and permutated observations, making predictions on new data using a complex model, picking a minimum number of features/predictors that give a high likelihood of class as predicted by a black box, and fitting a simple model to the permuted data with m features and similarity scores as weights. Although, the example explainability reports 700, 702 correspond to a LIME protocol, the adversarial attack detector 110 may generate an explainability report using any type of explainability protocol.

The example explainability report 700 of FIG. 7 includes data for three cases classification of Ramnit Malware and Lollipop Malware. The example adversarial attack detector 110 uses the LIME protocol to compute a set of content-based features and extract powerful complementary statistical features to reflect the structure of portable executable files. The example adversarial attack detector 110 utilizes a stacked ensemble classification protocol to utilize the richness of the available information in the number of the malware samples for training the malware classification model and the number of features used to represent the samples.

The example report 700 of FIG. 7 includes results form a LIME protocol for correctly predicted labels that include indicators of which features support and/or contradict the classification of malware. The example report 702 includes results form a LIME protocol for a number of misclassifications (e.g., predicted to be Ramnit malware when the files were Lollipop malware) that include indicators of which features support and/or contradict the misclassification of malware. The example report 702 reveals that malware samples indicated high value for "section-based features" which is a representative characteristic of "Ramnit Malware." The report 702 further reveals low values for features (e.g., environment string, string typefeatures) which is contradictory to the characteristics of the "Lollipop Malware" class. The example DL training server 102 can utilize such information to retrain and/or tune a malware classification model to improve the malware classification model to avoid such reasons for the misclassification.

Figure 8:
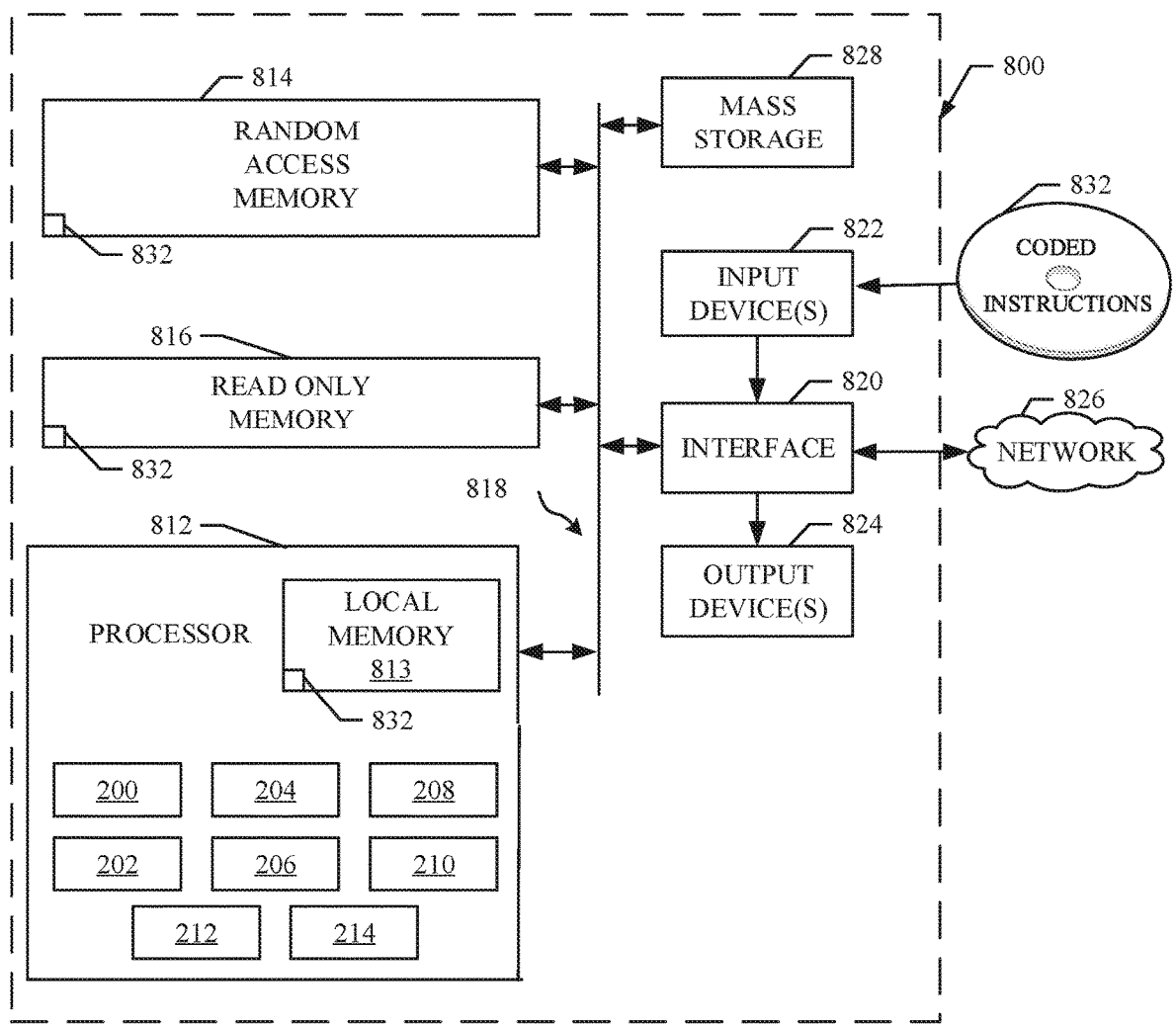
FIG. 8 is a block diagram of an example processing platform structured to execute the instructions of FIG. 3 to implement the example deep learning training server of FIGS. 1 and/or 2.

FIG. 8 is a block diagram of an example processor platform 800 structured to execute the instructions of FIG.

4 to implement the DL training server 102 of FIG. 2. The processor platform 800, 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example trained data storage 200, the example model trainer 202, the example trainer classification model 204, the example model modifier 206, the example difference determiner 208, the example comparator 210, the example DOE generator 212, and the example network interface 214.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 4 may be stored in the mass storage device 828, in the volatile memory 814, in the non-volatile memory 816, and/or on a removable non-transitory computer readable storage medium such as a CD or DVD.

Figure 9:
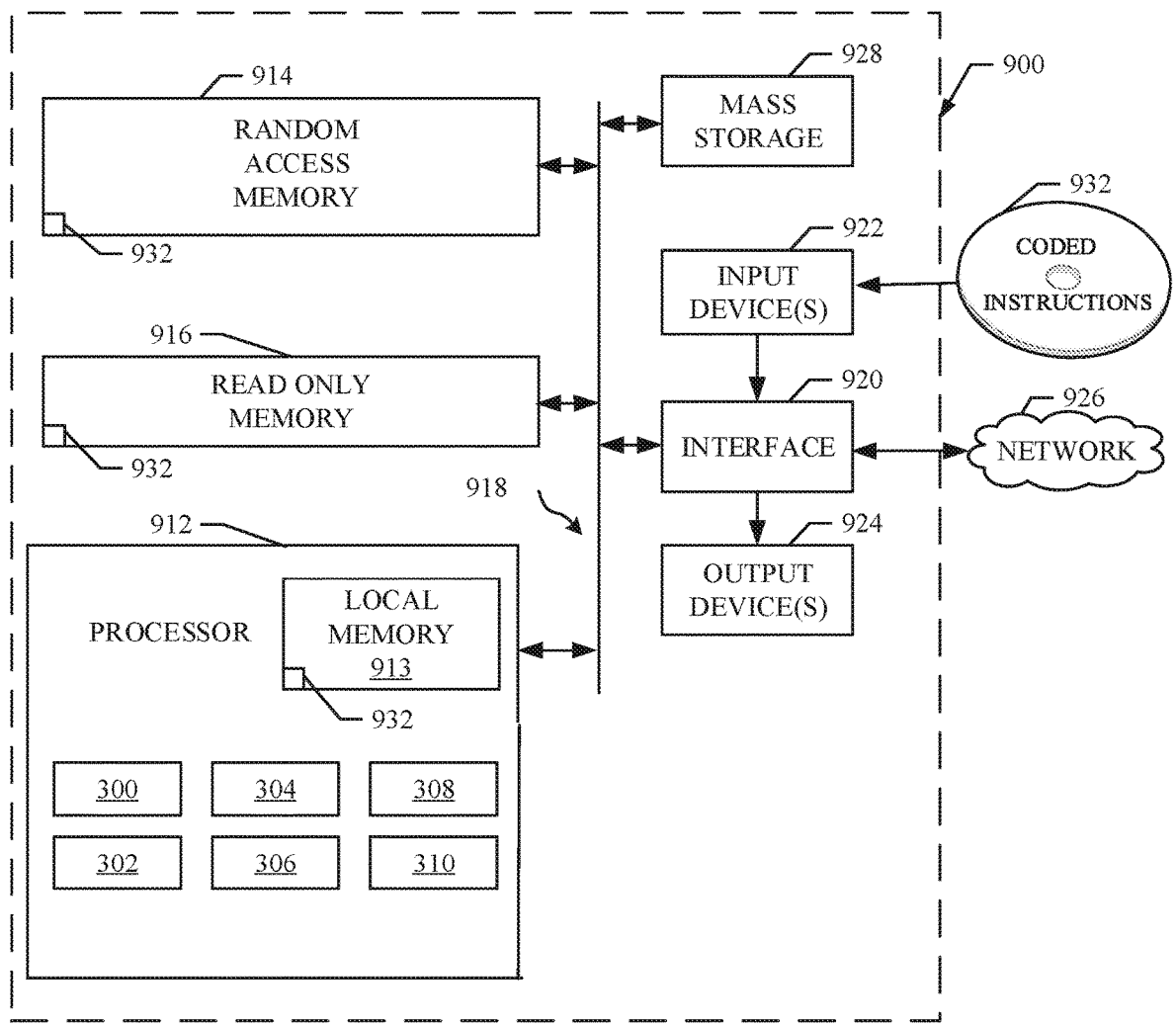
FIG. 9 is a block diagram of an example processing platform structured to execute the instructions of FIG. 3 to implement the example adversarial attack detector of FIGS. 1 and/or 3.

FIG. 9 is a block diagram of an example processor platform 900 structured to execute the instructions of FIGS. 5, 6A, and 6B to implement the example adversarial attack detector 110 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 300, the example component interface 302, the example RDOE generator 304, the example comparator 306, the example XAI generator 308, and the example drift/attack identifier 310.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS)

display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 5, 6A, and/or 6B may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed to defend against adversarial machine learning. The disclosed methods, apparatus and articles of manufacture improve the efficiency of using a computing device by the detectability of malware reconfiguring a trained malware classification model to replace one or more convolution layers of the model with a tree-based structure(s). Additionally, examples disclosed herein utilize (A) DOE and RDOE protocols and (B) explainability to identify adversarial attacks and/or model drift of a trained malware classification model. Accordingly, examples disclosed herein identify when there are problems with any machine learning based classification models so that the models can be retrained and/or tuned as soon as possible to provide more robust and effective malware protection to end users. Although examples disclosed herein is described in conjunction with malware, examples disclosed herein may be used in conjunction with any type of classification (e.g., image classification, text classification, and/or any other type of anomaly detection) in any type of domain that makes use of machine learning for classification. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus including:
a model trainer to train a classification model based on files with expected classifications; and
a model modifier to:
select a convolution layer of the trained classification model based on an analysis of the convolution layers of the trained classification model; and
replace the selected convolution layer with a tree-based structure to generate a modified classification model.

2. The apparatus of claim 1, wherein the model trainer is to train the trained classification model to output a score for an input, the score corresponding to whether the input is non-malware or a malware.

3. The apparatus of claim 1, wherein the model modifier is to select the convolution layer by:
providing an input into the trained classification model;
providing an adversarial input into the trained classification model; and
when the difference between (A) a first distance between the input and the adversarial input at a first layer of the trained classification model and (B) a second distance between the input and the adversarial input at a second layer preceding the first layer satisfies a threshold value, select the first layer to be the convolution layer.

4. The apparatus of claim 3, wherein the model modifier is to generate the adversarial input by adding a perturbation to the input.

5. The apparatus of claim 3, wherein the first and second distances are Euclidean distances.

6. The apparatus of claim 1, wherein the model modifier is to replace convolution layers subsequent the selected convolution layer with tree-based structures.

7. The apparatus of claim 1, further including an interface to deploy the modified classification model.

8. The apparatus of claim 1, wherein the modified classification model protects against gradient-based adversarial attacks.

9. A non-transitory computer readable storage medium comprising instructions which, when executed, cause one or more processors to at least:
train a classification model based on files with expected classifications;
select a convolution layer of the trained classification model based on an analysis of the convolution layers of the trained classification model; and
replace the selected convolution layer with a tree-based structure to generate a modified classification model.

10. The computer readable storage medium of claim 9, wherein the instructions cause the one or more processors to train the trained classification model to output a score for an input, the score corresponding to whether the input is non-malware or a malware.

11. The computer readable storage medium of claim 9, wherein the instructions cause the one or more processors to select the convolution layer by:
providing an input into the trained classification model;
providing an adversarial input into the trained classification model; and
when the difference between (A) a first distance between the input and the adversarial input at a first layer of the trained classification model and (B) a second distance between the input and the adversarial input at a second layer preceding the first layer satisfies a threshold value, select the first layer to be the convolution layer.

12. The computer readable storage medium of claim 11, wherein the instructions cause the one or more processors to generate the adversarial input by adding a perturbation to the input.

13. The computer readable storage medium of claim 11, wherein the first and second distances are Euclidean distances.

14. The computer readable storage medium of claim 9, wherein the instructions cause the one or more processors to replace convolution layers subsequent the selected convolution layer with tree-based structures.

15. The computer readable storage medium of claim 9, wherein the instructions cause the one or more processors to deploy the modified classification model.

16. The computer readable storage medium of claim 9, wherein the modified classification model protects against gradient-based adversarial attacks.

17. A method comprising:
- training, by executing an instruction with a processor, a classification model based on files with expected classifications;
- selecting, by executing an instruction with the processor, a convolution layer of the trained classification model based on an analysis of the convolution layers of the trained classification model; and
- replacing, by executing an instruction with the processor, the selected convolution layer with a tree-based structure to generate a modified classification model.

18. The method of claim 17, wherein the training of the trained classification model includes outputting a score for an input, the score corresponding to whether the input is non-malware or a malware.

19. The method of claim 17, wherein the selecting of the convolution layer includes:
- providing an input into the trained classification model;
- providing an adversarial input into the trained classification model; and
- when the difference between (A) a first distance between the input and the adversarial input at a first layer of the trained classification model and (B) a second distance between the input and the adversarial input at a second layer preceding the first layer satisfies a threshold value, select the first layer to be the convolution layer.

20. The method of claim 19, wherein the generating of the adversarial input includes adding a perturbation to the input.

\* \* \* \* \*